United States Patent
Marti et al.

(10) Patent No.: US 9,460,388 B2
(45) Date of Patent: Oct. 4, 2016

(54) RANGE CLASS ESTIMATION FOR RADIO FREQUENCY DEVICES

(71) Applicant: Apple Inc., Cupertino, CA (US)

(72) Inventors: Lukas M. Marti, Santa Clara, CA (US); Shannon M. Ma, San Francisco, CA (US); Pejman Lotfali Kazemi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 372 days.

(21) Appl. No.: 13/905,552

(22) Filed: May 30, 2013

(65) Prior Publication Data

US 2014/0358835 A1    Dec. 4, 2014

(51) Int. Cl.
| | |
|---|---|
| *G06N 5/02* | (2006.01) |
| *G01S 11/06* | (2006.01) |
| *H04B 17/26* | (2015.01) |
| *H04B 17/27* | (2015.01) |
| *H04B 17/318* | (2015.01) |
| *H04B 17/391* | (2015.01) |

(52) U.S. Cl.
CPC .............. *G06N 5/02* (2013.01); *G01S 11/06* (2013.01); *H04B 17/26* (2015.01); *H04B 17/27* (2015.01); *H04B 17/318* (2015.01); *H04B 17/3911* (2015.01)

(58) Field of Classification Search
CPC ......... G01S 11/06; G06N 5/02; H04B 17/26; H04B 17/27; H04B 17/318; H04B 17/3911
USPC .................... 455/41.2, 41.3, 67.11
See application file for complete search history.

(56) References Cited

U.S. PATENT DOCUMENTS

| | | | |
|---|---|---|---|
| 6,754,500 B1 * | 6/2004 | He | H04W 72/085 370/431 |
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |

(Continued)

FOREIGN PATENT DOCUMENTS

| | | | |
|---|---|---|---|
| CN | 103874198 A | * | 3/2013 |
| DE | 10 2008 024248 | | 12/2009 |

OTHER PUBLICATIONS

International Search Report and Written Opinion of the International Searching Authority, PCT Application Serial No. PCT/US2014/040066, Sep. 9, 2014, 11 pp.

*Primary Examiner* — Ping Hsieh
*Assistant Examiner* — Xin Jia
(74) *Attorney, Agent, or Firm* — Fish & Richardson P.C.

(57) ABSTRACT

Implementations are disclosed for obtaining a range state of a device operating in an indoor environment with radio frequency (RF) signal sources. In some implementations, windowed signal measurements obtained from RF signals transmitted by an RF signal source are classified into range classes that are defined by threshold values obtained from a RF signal propagation model. A range class observation is obtained by selecting a range class among a plurality of range classes based on a percentage of a total number of windowed signal measurements that are associated with the range class. The range class observation is provided as input to a state estimator that estimates a range class that accounts for process and/or measurement noise. The output of the state estimator is provided as input to a state machine.

39 Claims, 6 Drawing Sheets

(56) References Cited

U.S. PATENT DOCUMENTS

| | | |
|---|---|---|
| 8,223,074 B2 | 7/2012 | Alizadeh-Shabdiz |
| 8,369,264 B2 | 2/2013 | Brachet et al. |
| 8,478,297 B2 | 7/2013 | Morgan et al. |
| 8,836,580 B2 | 9/2014 | Mendelson |
| 8,866,673 B2 | 10/2014 | Mendelson |
| 8,896,485 B2 | 11/2014 | Mendelson |
| 8,941,485 B1 | 1/2015 | Mendelson |
| 8,983,493 B2 | 3/2015 | Brachet et al. |
| 9,020,687 B2 | 4/2015 | Mendelson |
| 9,204,251 B1 | 12/2015 | Mendelson |
| 9,204,257 B1 | 12/2015 | Mendelson |
| 2003/0228846 A1 | 12/2003 | Berliner et al. |
| 2010/0305779 A1* | 12/2010 | Hassan et al. ............... 701/2 |
| 2011/0009068 A1 | 1/2011 | Miura |
| 2011/0287795 A1* | 11/2011 | Cahill .......................... 455/509 |
| 2011/0306307 A1* | 12/2011 | Kauppert et al. .......... 455/67.13 |
| 2011/0306357 A1 | 12/2011 | Alizadeh-Shabdiz et al. |
| 2012/0046045 A1* | 2/2012 | Gupta et al. ............... 455/456.1 |
| 2012/0064855 A1 | 3/2012 | Mendelson |
| 2013/0065584 A1 | 3/2013 | Lyon et al. |
| 2014/0180817 A1 | 6/2014 | Zilkha et al. |
| 2014/0220883 A1 | 8/2014 | Emigh et al. |
| 2014/0335897 A1 | 11/2014 | Clem et al. |

* cited by examiner

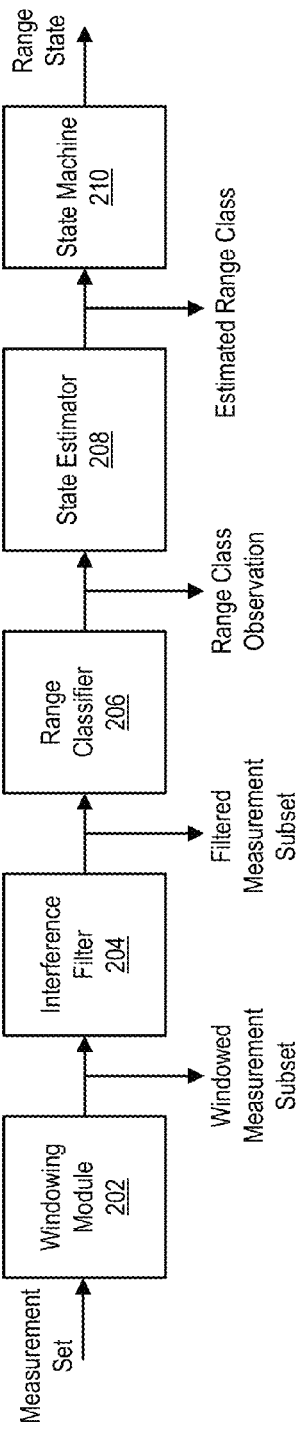
FIG. 2
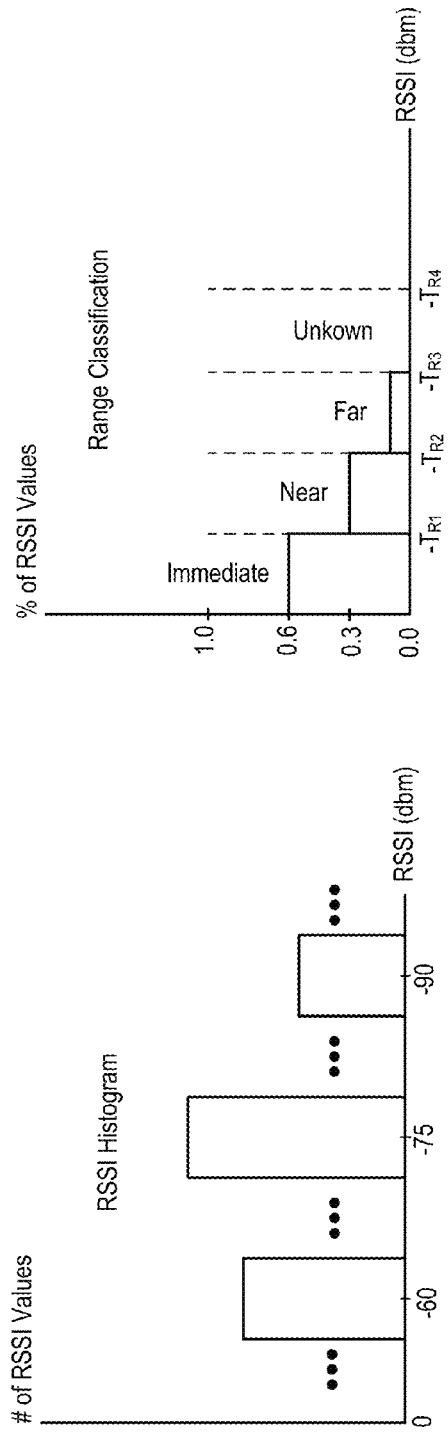
FIG. 4
FIG. 3

US 9,460,388 B2

RANGE CLASS ESTIMATION FOR RADIO FREQUENCY DEVICES

TECHNICAL FIELD

This subject matter is generally related to range estimation for electronic devices.

BACKGROUND

Estimating range between devices is of particular interest to applications that require two or more devices to be in close proximity to communicate and perform transactions. There are several radio frequency (RF) technologies available that can be used to estimate range. These technologies include but are not limited Wi-Fi, Bluetooth Low Energy (BTLE) and Near Field Communication (NFC). Since these RF technologies were not designed for ranging service only, these RF technologies have parasitic effects (e.g., multipath interference) that limit the ability of these RF technologies to estimate range.

SUMMARY

Implementations are disclosed for obtaining a range state of a device operating in an indoor environment with RF signal sources. In some implementations, windowed signal measurements obtained from RF signals transmitted by a RF signal source are classified into range classes that are defined by threshold values obtained from a RF signal propagation model. A range class observation is obtained by selecting a range class among a plurality of range classes based on a percentage of a total number of windowed signal measurements that are associated with the range class. The range class observation is provided as input to a state estimator that estimates a range class that accounts for process and/or measurement noise. The output of the state estimator is provided as input to a state machine which outputs a range state that can be used to initiate one or more actions on the device, such as communicating with the RF signal source or other devices associated with the environment.

In some implementations, a method comprises: a method comprising: obtaining, at a device, a set of signal measurements based on a radio frequency (RF) signal transmitted by a RF signal source; applying a window function to the set of signal measurements to obtain a subset of signal measurements; obtaining a range class observation based on a RF signal propagation model and the subset of signal measurements; and obtaining an estimated range class using the range class observation.

Other implementations are directed to methods, systems and computer-readable mediums.

DESCRIPTION OF DRAWINGS

FIG. 2 is a block diagram of a system for estimating range.
FIG. 3 is a histogram of RSSI values.
FIG. 4 is a histogram illustrating example range classes.

DETAILED DESCRIPTION

System Overview

Figure 1:
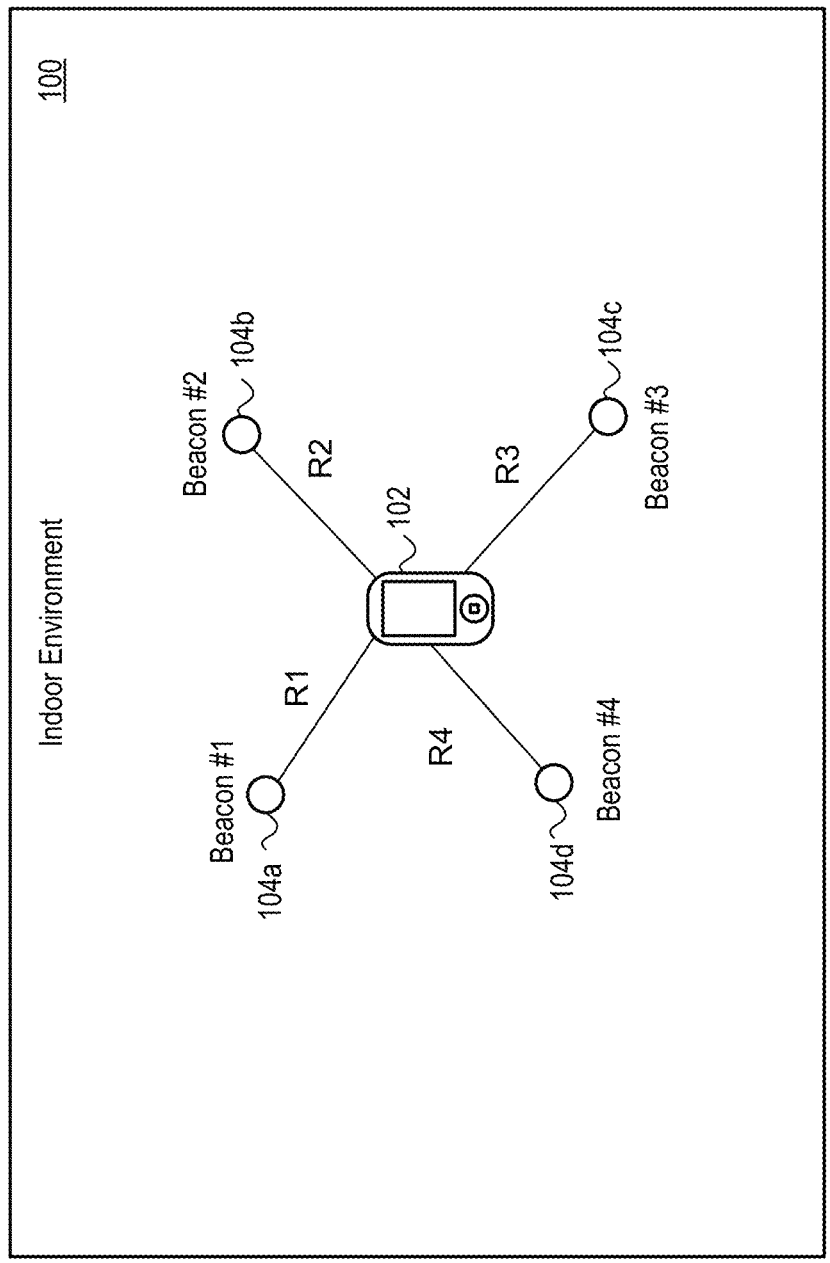
FIG. 1 illustrates an example indoor environment.

FIG. 1 illustrates an example indoor environment 100 where mobile device 102 can estimate ranges R1-R4 to RF signal sources 104a-104d. An example indoor environment 100 can be a building (e.g., retail store). RF signal sources 104a-104d can be RF beacons (e.g., BTLE beacons) or any other RF signal source capable of generating and transmitting RF signals. Mobile device 102 can be a smartphone, navigation device, wearable computer (e.g., wristwatch), electronic tablet or any other device capable of receiving RF signals. RF signal sources 104a-104d transmit RF signals that are received by a RF receiver (or transceiver) of mobile device 102.

When mobile device 102 establishes communication with one of RF signal sources 104a-104d, information can be transmitted from the RF signal source to mobile device 102. Information can include advertisements, coupons, maps, directions, instructions or any other information that can be processed by an application running on mobile device 102. In some implementations, it is desirable to send information when mobile device 102 is within a certain range of the RF signal source (e.g., 30 centimeters).

Mobile device 102 can obtain a range state using RF signal measurements obtained from RF signals transmitted from the RF signal source (e.g., beacon transmissions). One example of an RF signal measurement is a received signal strength indicator (RSSI). RSSI is specified in the IEEE 802.11 specification and is an indication of the power level being received by an antenna. RSSI can be mathematically defined as being approximately the ratio of the power of the received signal and a reference received power (e.g., 1 mW) given by $$RSSI \propto 10\log\frac{P_r}{P_{ref}}, \quad [1]$$

where the higher the RSSI number (or less negative) the stronger the signal. Hereinafter, RSSI values will be expressed in dBm.

In addition to walls and a ceiling, indoor environment 100 can include various furniture, structures, customers and other objects that can reflect RF signals from the RF signal sources, causing multipath interference at the RF receiver (or transceiver) of mobile device 102. Multipath interference occurs when a RF signal from a RF signal source travels to the RF receiver of mobile device 102 along two or more paths, resulting in constructive and/or destructive interference at the RF receiver. Multipath interference makes range difficult to estimate.

The received power $P_{r\_d}$ (in dBm) at a distance d from an RF signal source, for an indoor environment with multipath interference can be modeled as $$P_{r\_d} = -10*\beta*\log 10\left(\frac{d}{d_o}\right) + P_{r\_do}, \quad [2]$$

where β is an exponent representing path loss, $d_o$ is a reference distance (e.g., 1 meter) and $P_{r\_do}$ is the reference power received at reference distance $d_o$ (e.g., 1 mW). The value of depends on the specific propagation environment, such as the type of construction material, architecture and location within the environment (e.g., a building). Lowering the value of β lowers the signal loss. The values of β can range from 1.2 to 8 (e.g., 1.8). Equation [2] gives RSSI in dBm for a distance d in meters. As discussed in reference to FIG. 4, Equation [2] can be used to convert distance thresholds for range classes (in meters) into RSSI thresholds (in dBm), so that RSSI values can be assigned to range classes based on RSSI thresholds without converting the RSSI values to distances.

FIG. 2 is a block diagram of a system 200 for estimating range. In some implementations, system 200 includes windowing module 202, interference filter 204, range classifier 206, state estimator 208 and state machine 210. System 200 can be implemented in software, hardware or a combination of software and hardware. Example architecture for implementing system 200 is described in reference to FIG. 8.

System 200 is configured to provide a range state that can be used by applications that need to know the distance between a mobile device and an RF signal source, such as a BTLE beacon. In some implementations, range classes include: Immediate, Near, Far and Unknown. More or fewer classes can be used as needed for an application. For example, the Immediate range class can be defined as a range between a mobile device and a RF signal source that is, e.g., 0 to 30 centimeters. The Near range class can be defined as a range between a mobile device and a RF signal source that is, e.g., 30 centimeters to 4 meters. The Far range class can be defined as a range between a mobile device and a RF signal source that is, e.g., 4 to 30 meters. The Unknown range class can be defined as the range between a mobile device and a signal source (e.g., greater than 30 meters). Distance thresholds can separate the range classes. The distance thresholds (e.g., in meters) can be converted to RSSI thresholds in dBm using Equation [2], to enable classification of RSSI values, as described in reference to FIG. 4, which shows a range class histogram where the range classes (bins) are separated by RSSI thresholds $T_{R1}$-$T_{R4}$.

Windowing module 202 applies a windowing function to a set of signal measurements obtained by mobile device 102 from RF signals, to provide a subset of signal measurements. In some implementations, the set of signal measurements can be a vector of RSSI values computed using Equation [1]. The size of the window can be selected to ensure that the set of signal measurements collected are wide sense stationary (WSS). For some commercial BTLE beacons, RF signals are transmitted at 10 Hz. If the window size is one second, then the RSSI vector will includes 10 RSSI values. The window type and size can be selected based on the specific requirements of an application. In some implementations the window function can be a rectangular window function.

The windowed subset of signal measurements can be processed by interference filter 204. Interference filter 204 can eliminate signal measurements that exceed minimum and maximum values due to interference caused by, for example, electronic components in the mobile device. Interference filter 204 may be optional.

Range classifier 206 takes the subset of signal measurements and assigns them to range classes. The range classes, as described above, can be defined by thresholds $T_{R1}$-$T_{R4}$ determined by the RF signal propagation model of Equation [2]. In implementations where RSSI values are the signal measurements, the RSSI values can be assigned to n bins of an RSSI histogram. For example, if the range of the RSSI values is 0-100 dBm, then there can be 100 bins in the RSSI histogram or 1 bin per dBm. An example RSSI histogram is illustrated in FIG. 3. The RSSI histogram can be used to approximate a probability density function (PDF) for the RSSI values.

A cumulative distribution function (CDF) can be used to assign the signal measurements to range classes. Example range classes are illustrated in FIG. 4. In the example shown, the range classes are separated by threshold values $T_{R1}$-$T_{R4}$, which in this example are in dBm. In the example shown, after the CDF was applied, 60% of the RSSI values from the RSSI histogram were assigned to the Immediate range class, 30% of the RSSI values were assigned to the Near range class and 10% of the RSSI values were assigned to the Far range class. No RSSI values were assigned to the Unknown range class in this example.

Once the RSSI values are assigned to range classes, the range classes are processed in a specified order where the first range class processed represents the closest distance to the RF signal source. In the current example, the specified order is Immediate, Near, Far, Unknown. When, during the processing, it is discovered that a range class has at least X % (e.g., 30%) of the total number of RSSI values in the RSSI histogram, then that class is designated as a range class observation and is provided as input into state estimator 208. In the example shown and assuming X=30%, the Immediate class has 60% of the total RSSI values and is therefore designated as the range class observation. No further processing need be done in this example. If, however, the Immediate class did not have at least 30% of the total RSSI values, then the Near class would be processed. If the Near class has at least 30% of the RSSI values, the Near class would be the designated range class observation. If not, then the Far class would be processed. If none of the Immediate, Near or Far range classes contain at least 30% of the RSSI values, the designated range class observation is Unknown. In some implementations, Unknown rang class observations are not provided as input to state estimator 208.

In some implementations, state estimator 208 can be implemented using an adaptive filter (e.g., adaptive low pass filter). In other implementations, state estimator 208 can be implemented using an extended Kalman filter (EKF) formulation that includes a time update phase and a measurement update phase as follows:

A. Time Update
1. Propagate state $$\bar{x}^-_k = \Phi \bar{x}_{k-1} + B\bar{u}_{k-1}$$

2. Propagate error covariance $$P^-_k = \Phi P_{k-1} \Phi^T + Q$$

B. Measurement Update
1. Compute Kalman gain $$K_k = P^-_k H^T (H P^-_k H^T + R)^{-1}$$

2. Update estimate with measurement and Kalman gain $$\bar{x}_k = \bar{x}^-_k + K_k(\bar{z}_k - H\bar{x}^-_k)$$

3. Update error covariance with Kalman gain $$P_k = (I - K_k H) P^-_k \qquad [3]$$

Since, in this example, range class is the only state to be estimated, the EKF Equations [3] can be simplified as follows (assuming floating point numbers):

1. Propagate range class estimating according to [4]. The range classes are each assigned a value. For example, Immediate=1.0, Near=2.0, Far=3.0 and Unknown=4.0.

Using these values, if the range class $x_k$ falls in the range 0.0-1.5, the range class is Immediate, if $x_k$ falls in the range 1.5-2.5, the range class is Near, and if $x_k$ is greater than 2.5, the range class is Far.

$$x_k = x_{k-1} \quad [4]$$

2. Propagate error covariance according to [5], where an activity factor (AF) is used to scale system noise q to account for system biases and can be set to a floating point number that is greater than zero.

$$p_k = p_{k-1} + q \cdot AF \quad [5]$$

3. Compute Kalman gain $k_k$ according to [6], where $r_k$ is measurement noise that can be a floating point value (e.g., 0.5) that is determined empirically or mathematically based on the signal propagation model [2].

$$k_k = \frac{p_k}{(p_k + r_k)} \quad [6]$$

4. Update range class estimate with measurement and Kalman gain according to [7]. The parameter $z_k$ is the range class observation determined by range classifier 206.

$$x_k = x_k + k_k(z_k - x_k) \quad [7]$$

5. Update error covariance with Kalman gain according to [8].

$$p_k = (1 - k_k)p_k \quad [8]$$

Once the updated range class estimate is obtained it can be provided as input into state machine 210. The process noise $q_k$ and measurement noise $r_k$ can be determined based on the motion context of mobile device 102. For example, $q_k$, $r_k$ can be adjusted depending on whether the mobile device is stationary or moving.

Figure 5:
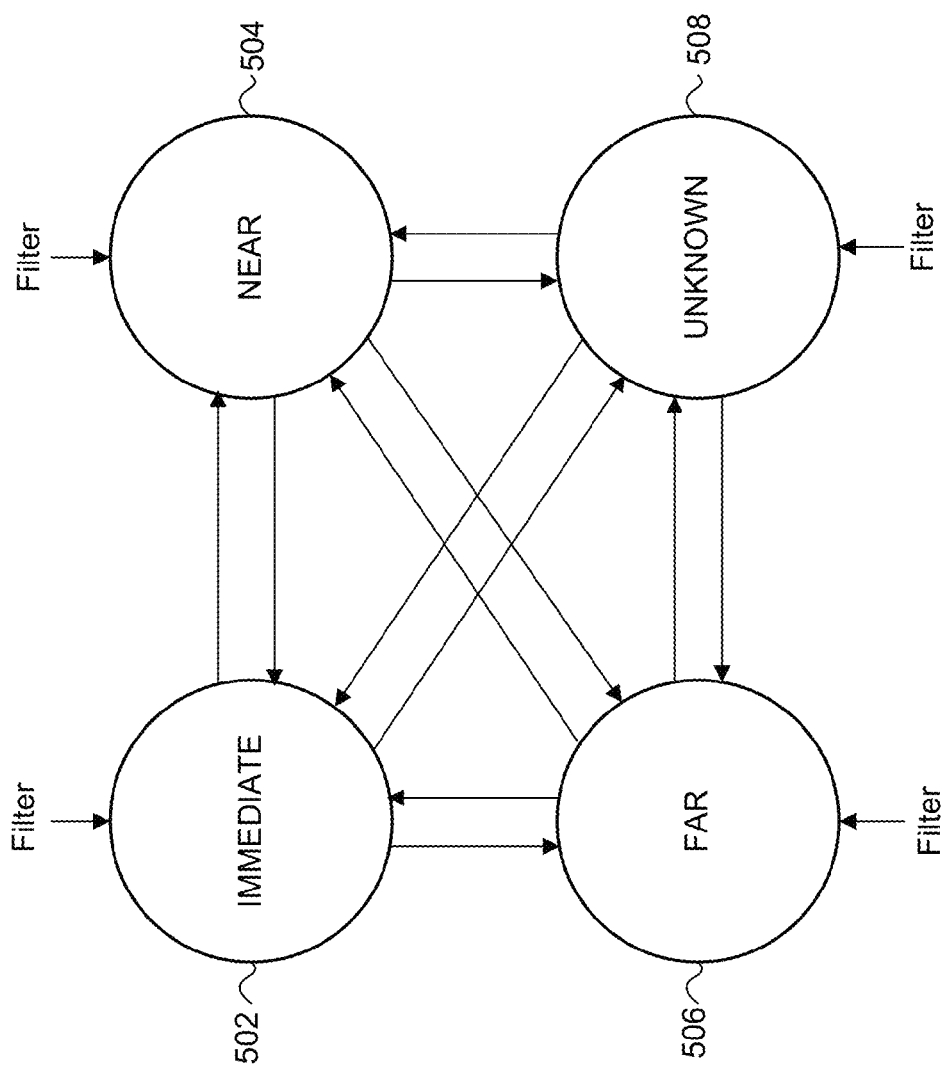
FIG. 5 is a state diagram illustrating an example state machine for transitioning among range states.

FIG. 5 is a state diagram illustrating state machine 210 for transition between range states. Continuing with the previous example, there are four range states: Immediate 502, Near 504, Far 506 and Unknown 508. The triggers for transitions between the range states are based on a number of consecutive adjacent range class estimates. The output of state machine 210 is one of range states 502, 504, 506, 508. The range state can be provided to one or more applications running on mobile device 102 to initiate actions on mobile device 102.

The entry point into state machine 210 can be based on the updated range class estimate of Equation [7]. For example, if the first range class estimate determined is Immediate, state machine 210 would start in Immediate state 502. State machine 210 transitions from Immediate state 502 to Near state 504 if state estimator 208 outputs at least 2 consecutive Near range class estimates. If in Near state 504, then one Immediate class estimate will cause a transition to Immediate state 502. If in Near state 504, then 2 consecutive Far range class estimates will cause a transition to Far state 506. Generally, the number of n consecutive adjacent range class estimates needed to transition between any two states of state machine 210 can be determined based on performance criteria or application requirements.

Example Process

Figure 6:
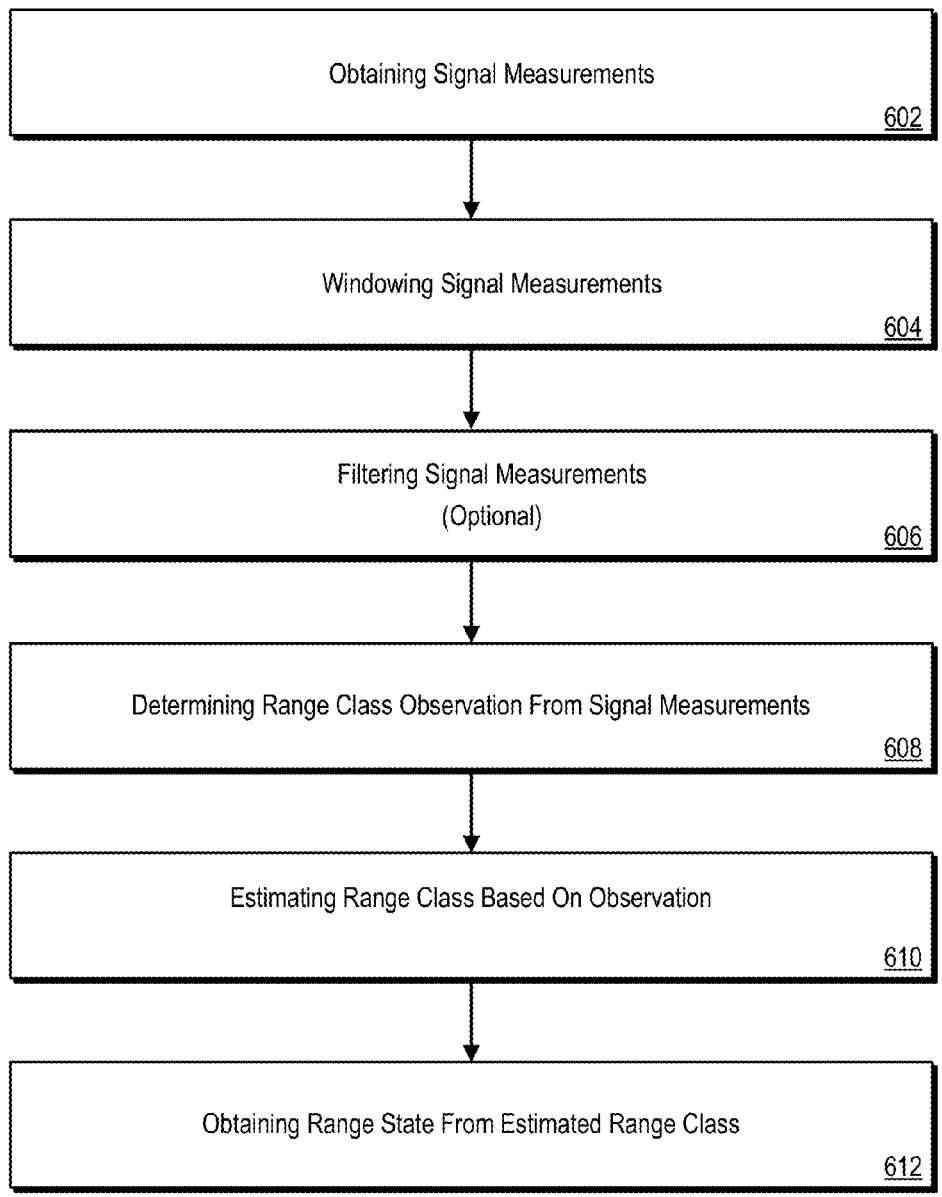
FIG. 6 is a flow diagram of an example process for estimating range classes.

FIG. 6 is a flow diagram of an example process 600 for estimating range. Process 600 can be implemented by mobile device architecture 800 described in reference to FIG. 8. Process 600 can be triggered when mobile device 102 is operating within indoor environments 100, 700 as described in reference to FIGS. 1 and 7.

In some implementations, process 600 can begin by obtaining a set of RF signal measurements from RF signals transmitted by a RF signal source (602). In some implementations, the RF signal source can be a BTLE beacon. The set of RF signal measurements can be RSSI values.

Process 600 can continue by windowing the set of RF signal measurements to obtain a subset of RF signal measurements (604). The window function can generate a subset of signal measurements based on the assumed dynamics of the mobile device, so that the measurements are WSS, where the mean and variance do not change over time or position of mobile device 102 in indoor environment 100. An example window function is a rectangular window function with a size of one second or less.

Process 600 can continue by filtering the subset of signal measurements to remove erroneous RF signal measurements due to, for example, electronic components in the mobile device (606). Step 606 is optional. For example, a mean of the subset of RF signal measurements shall fall within a range defined by a minimum value (e.g., -90 dBm) or a maximum value (e.g., 0 dBm). If the RF signal measurements are RSSI values, then this condition is given by Equation [9], where $\overline{RSS}$ is the mean $$\min < \overline{RSS} < \max \quad [9]$$

Process 600 can continue by determining a range class observation from the subset (and possibly filtered by step 604) of signal measurements (608). In some implementations, the probability density function is estimated from a histogram of the RSSI values. A CDF can then be used to assign RSSI values to range classes. In some implementations, the range classes can be Immediate, Near, Far and Unknown, as described in reference to FIG. 4. The thresholds $T_{R1}$-$T_{R4}$ that define the class boundaries in a range class histogram (See FIG. 4) can be determined using the RF signal propagation model [2]. The range classes can be processed from Immediate to Far until process 600 discovers that a range class has X % of the total signal measurements, at which time the processing stops and the range class with X % of the total signal measurements is the range class observation.

Process 600 can continue by estimating the range class based on the range class observation (610). In some implementations, the range classes are assigned floating point values which are input into a state estimator. For example, Immediate=1.0, Near=2.0, Far=3.0 and Unknown=4.0. The state estimator can be any suitable state estimator or predictor, including a linear or non-linear predictive filter, adaptive filter or an EKF. In some implementations, the state estimator computes an estimated range class while taking into account the effects of process noise and measurement noise (e.g., using an EKF).

Process 600 can continue by obtaining a range state from the estimated range class (612). For example, the estimated range class can be input to a state machine that outputs a range state based on a number of consecutive adjacent range state estimates, as described in reference to FIG. 5.

The range state resulting from step 612 can be provided to applications through an Application Programming Interface (API). For example, the range state can be used to determine whether the mobile device is in the immediate vicinity of a RF signal source, near a RF signal source or far from a RF signal source and initiate actions based on the range state. For example, if the range state is Immediate, an application running on the mobile device may communicate with a server computer associated with the indoor environment (e.g., a retail store) through the RF signal source or through another communication channel. An identifier of the RF signal source (e.g., a MAC address) and the Immediate state can be used by the server computer to determine the range of the mobile device from a RF signal source and send various information to the mobile device through the RF signal source or other communication channel, such as advertisements, coupons, instructions, maps, audio or video files, command for initiating force feedback on the mobile device (e.g., a command to vibrate) or any other desired action.

Example Operating Environment

Figure 7:
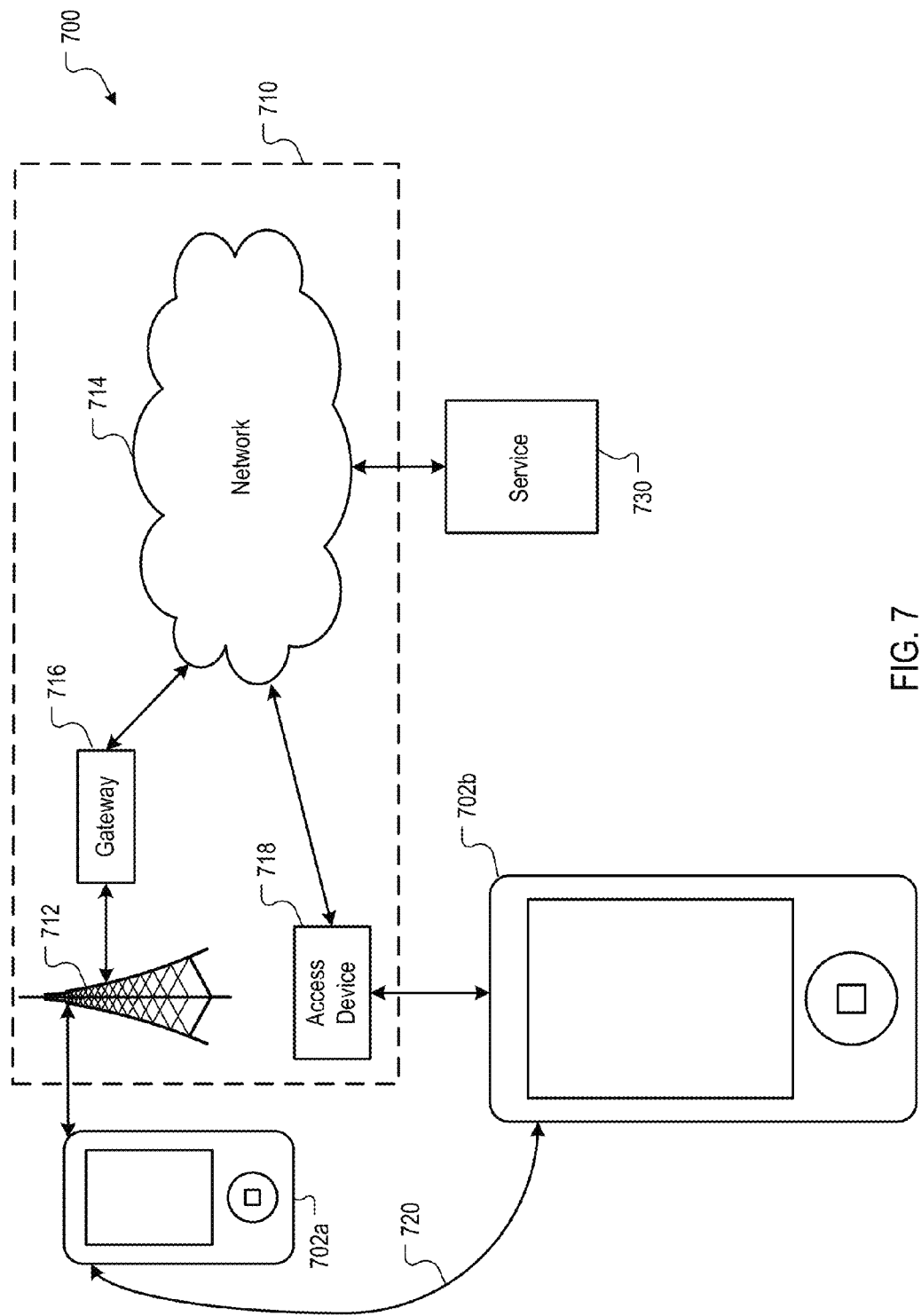
FIG. 7 illustrates an example operating environment for a mobile device capable of determining range state.

FIG. 7 illustrates an example operating environment for a mobile device. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11x wireless access device, can provide communication access to the wide area network 714.

In some implementations, both voice and data communications can be established over the wireless network 712 and the access device 718. For example, the mobile device 702a can place and receive phone calls (e.g., using VoIP protocols), send and receive e-mail messages (e.g., using POP3 protocol), and retrieve electronic documents and/or streams, such as web pages, photographs, and videos, over the wireless network 712, gateway 716, and wide area network 714 (e.g., using TCP/IP or UDP protocols). Likewise, in some implementations, the mobile device 702b can place and receive phone calls, send and receive e-mail messages, and retrieve electronic documents over the access device 718 and the wide area network 714. In some implementations, the mobile device 702a or 702b can be physically connected to the access device 718 using one or more cables and the access device 718 can be a personal computer. In this configuration, the mobile device 702a or 702b can be referred to as a "tethered" device.

The mobile devices 702a and 702b can also establish communications by other means. For example, the wireless device 702a can communicate with other wireless devices, e.g., other mobile devices 702a or 702b, cell phones, etc., over the wireless network 712. Likewise, the mobile devices 702a and 702b can establish peer-to-peer communications 720, e.g., a personal area network, by use of one or more communication subsystems, such as the RF signal sources 104a-104c described in reference to FIG. 1. Other communication protocols and topologies can also be implemented.

The mobile device 702a or 702b can, for example, communicate with one or more services over the one or more wired and/or wireless networks. For example, navigation service 730 can provide navigation information, e.g., map information, location information, route information, and other information, to the mobile device 702a or 702b.

Example Mobile Device Architecture

Figure 8:
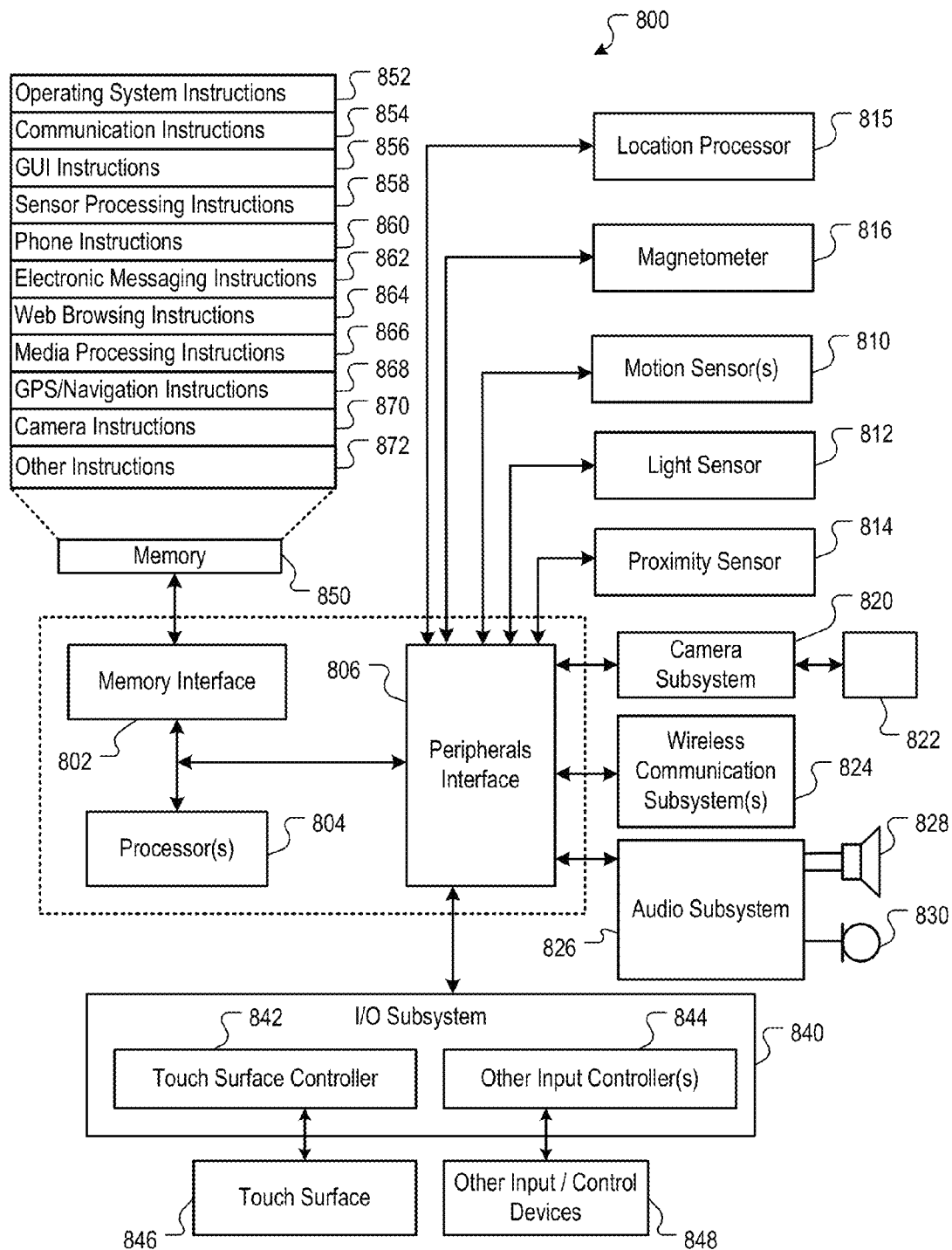
FIG. 8 is a block diagram of example mobile device architecture capable of determining range state.

FIG. 8 is a block diagram of example mobile device architecture. Architecture 800 may be implemented in any device capable of implementing the features and processes described in reference to FIGS. 1-7, including but not limited to portable computers, smart phones, navigation devices and electronic tablets.

Architecture 800 may include memory interface 802, data processor(s), image processor(s) or central processing unit (s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functionalities. For example, motion sensor 810, light sensor 812, and proximity sensor 814 may be coupled to peripherals interface 806 to facilitate orientation, lighting, and proximity functions of the device. For example, in some implementations, light sensor 812 may be utilized to facilitate adjusting the brightness of touch surface 846. In some implementations, motion sensor 810 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 806, such as a temperature sensor, a biometric sensor, or other sensing device, to facilitate related functionalities.

Location processor 815 (e.g., GPS receiver, WiFi baseband processor) may be connected to peripherals interface 806 to provide geo-positioning. Electronic magnetometer 816 (e.g., an integrated circuit chip) may also be connected to peripherals interface 806 to provide data that may be used to determine the direction of magnetic North. Thus, electronic magnetometer 816 may be used as an electronic compass.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC networks and Bluetooth™ networks. Communication subsystems 824 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 826 may be coupled to a speaker 828 and one or more microphones 830 to facilitate voice-enabled functions, such as voice recognition, voice replication, digital recording, and telephony functions.

I/O subsystem 840 may include touch controller 842 and/or other input controller(s) 844. Touch controller 842 may be coupled to a touch surface 846. Touch surface 846 and touch controller 842 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 846. In one implementation, touch surface 846 may display virtual or soft buttons and a virtual keyboard, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

In some implementations, device 800 may present recorded audio and/or video files, such as MP3, AAC, and MPEG files. In some implementations, device 800 may include the functionality of an MP3 player and may include a pin connector for tethering to other devices. Other input/output and control devices may be used.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers. Communication instructions 854 may also be used to select an operational mode or communication medium for use by the device, based on a geographic location (obtained by the GPS/Navigation instructions 868) of the device. Memory 850 may include graphical user interface instructions 856 to facilitate graphic user interface processing, including a touch model for interpreting touch inputs and gestures; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes; camera instructions 870 to facilitate camera-related processes and functions; and other instructions 872 for implementing the features and processes described in reference to FIGS. 1-7.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   obtaining, at a device, a set of signal measurements based on a radio frequency (RF) signal transmitted by a RF signal source;
   applying a window function to the set of signal measurements to obtain a subset of signal measurements;
   obtaining a probability density function for the subset of signal measurements;
   obtaining a cumulative distribution function of the subset of signal measurements from the probability density function;
   defining a plurality of range classes based on the cumulative distribution function and an RF signal propagation model, where each range class includes a percentage of the subset of signal measurements;
   processing the range classes in a specified order until a range class is identified from the plurality of range classes that includes a threshold percentage of signal measurements, where the first range class processed represents a closest distance to the RF signal source;
   responsive to identifying the range class that includes the threshold percentage of signal measurements, designating the identified range class as a range class observation; and
   obtaining an estimated range class using the range class observation, where the method is performed by one or more processors.

2. The method of claim 1, further comprising:
   obtaining a first range state from the estimated range class.

3. The method of claim 2, further comprising:
   transitioning from the first range state to a second range state based on a number of consecutive adjacent range class estimates.

4. The method of claim 2, further comprising:
   initiating an action at the device based on the range state.

5. The method of claim 1, where the threshold values are distances between the device and the RF signal source.

6. The method of claim 1, where the threshold values are in power units.

7. The method of claim 1, where the probability density function is obtained from a histogram of the subset of signal measurements.

8. The method of claim 1, where obtaining an estimated range class using the range class observation, further comprises:
   obtaining the estimated range class using a formulation that accounts for process noise and measurement noise.

9. The method of claim 8, where a Kalman filter is used to obtain the estimated range class.

10. The method of claim 1, further comprising:
    filtering the subset of signal measurements to remove erroneous measurements due to interference.

11. The method of claim 1, where the signal measurements are received signal strength indicator (RSSI) values.

12. The method of claim 1, where the window function provides a window size that is less than or equal to 1 second.

13. The method of claim 1, where the RF signal propagation model is given by $$P_{r\_d} = -10 * \beta * \log 10\left(\frac{d}{d_o}\right) + P_{r\_do},$$

where $\beta$ is an exponent representing path loss and depends on a specific propagation environment, $d_o$ is a reference distance, $P_{r\_do}$ is a reference power received at the reference distance $d_o$, and $P_{r\_d}$ is a received power at a distance d from the RF signal source.

14. A system comprising:
    one or more processors;
    memory coupled to the one or more processors and configured to store instructions, which, when executed by the one or more processors, causes the one or more processors to perform operations comprising:
      obtaining a set of signal measurements based on a radio frequency (RF) signal transmitted by a RF signal source;
      applying a window function to the set of signal measurements to obtain a subset of signal measurements;

obtaining a probability density function for the subset of signal measurements;

obtaining a cumulative distribution function of the subset of signal measurements from the probability density function;

defining a plurality of range classes based on the cumulative distribution function and an RF signal propagation model, where each range class includes a percentage of the subset of signal measurements;

processing the range classes in a specified order until a range class is identified from the plurality of range classes that includes a threshold percentage of signal measurements, where the first range class processed represents a closest distance to the RF signal source;

responsive to identifying the range class that includes the threshold percentage of signal measurements, designating the identified range class as a range class observation; and obtaining an estimated range class using the range class observation.

15. The system of claim 14, where the memory stores instructions, which, when executed by the one or more processors, causes the one or more processors to perform the operation of:

obtaining a first range state from the estimated range class.

16. The system of claim 15, where the memory stores instructions, which, when executed by the one or more processors, causes the one or more processors to perform the operation of:

transitioning from the first range state to a second range state based on a number of consecutive adjacent range class estimates.

17. The system of claim 15, where the memory stores instructions, which, when executed by the one or more processors, causes the one or more processors to perform the operation of:

initiating an action based on the range state.

18. The system of claim 14, where the threshold values are distances between the device and the RF signal source.

19. The system of claim 14, where the threshold values are in power units.

20. The system of claim 14, where the probability density function is obtained from a histogram of the subset of signal measurements.

21. The system of claim 14, where obtaining an estimated range class using the range class observation, further comprises:

obtaining the estimated range class using a formulation that accounts for process noise and measurement noise.

22. The system of claim 21, where a Kalman filter is used to obtain the estimated range class.

23. The system of claim 14, where the memory stores instructions, which, when executed by the one or more processors, causes the one or more processors to perform the operation of:

filtering the subset of signal measurements to remove erroneous measurements due to interference.

24. The system of claim 14, where the signal measurements are received signal strength indicator (RSSI) values.

25. The system of claim 14, where the window function provides a window size that is less than or equal to 1 second.

26. The system of claim 14, where the RF signal propagation model is given by $$P_{r\_d} = -10 * \beta * \log 10 \left( \frac{d}{d_o} \right) + P_{r\_do},$$

where $\beta$ is an exponent representing path loss and depends on a specific propagation environment, $d_o$ is a reference distance, $P_{r\_do}$ is a reference power received at the reference distance $d_o$, and $P_{r\_d}$ is a received power at a distance d from the RF signal source.

27. A non-transitory, computer-readable storage medium having instructions stored thereon, which, when executed by one or more processors, causes the one or more processors to perform operations comprising:

obtaining a set of signal measurements based on a radio frequency (RF) signal transmitted by a RF signal source;

applying a window function to the set of signal measurements to obtain a subset of signal measurements;

obtaining a probability density function for the subset of signal measurements;

obtaining a cumulative distribution function of the subset of signal measurements from the probability density function;

defining a plurality of range classes based on the cumulative distribution function and an RF signal propagation model, where each range class includes a percentage of the subset of signal measurements;

processing the range classes in a specified order until a range class is identified from the plurality of range classes that includes a threshold percentage of signal measurements, where the first range class processed represents a closest distance to the RF signal source;

responsive to identifying the range class that includes the threshold percentage of signal measurements, designating the identified range class as a range class observation; and obtaining an estimated range class using the range class observation.

28. The non-transitory, computer-readable storage medium of claim 27, further comprising:

obtaining a first range state from the estimated range class.

29. The non-transitory, computer-readable storage medium of claim 28, further comprising:

transitioning from the first range state to a second range state based on a number of consecutive adjacent range class estimates.

30. The non-transitory, computer-readable storage medium of claim 28, further comprising:

initiating an action at the device based on the range state.

31. The non-transitory, computer-readable storage medium of claim 27, where the threshold values are distances between the device and the RF signal source.

32. The non-transitory, computer-readable storage medium of claim 27, where the threshold values are in power units.

33. The non-transitory, computer-readable storage medium of claim 27, where the probability density function is obtained from a histogram of the subset of signal measurements.

34. The non-transitory, computer-readable storage medium of claim 27, where obtaining an estimated range class using the range class observation, further comprises:

obtaining the estimated range class using a formulation that accounts for process noise and measurement noise.

35. The non-transitory, computer-readable storage medium of claim 34, where a Kalman filter is used to obtain the estimated range class.

36. The non-transitory, computer-readable storage medium of claim 27, further comprising:
  filtering the subset of signal measurements to remove erroneous measurements due to interference.

37. The non-transitory, computer-readable storage medium of claim 27, where the signal measurements are received signal strength indicator (RSSI) values.

38. The non-transitory, computer-readable storage medium of claim 27, where the window function provides a window size that is less than or equal to 1 second.

39. The non-transitory, computer-readable storage medium of claim 27, where the RF signal propagation model is given by $$P_{r\_d} = -10 * \beta * \log 10\left(\frac{d}{d_o}\right) + P_{r\_do},$$

where β is an exponent representing path loss and depends on a specific propagation environment, $d_o$ is a reference distance, $P_{r\_do}$ is a reference power received at the reference distance $d_o$, and $P_{r\_d}$ is a received power at a distance d from the RF signal source.

* * * * *